Feb. 5, 1952  I. E. McCABE  2,584,482
ELECTRIC REFRIGERATION AND DEFROSTER CONTROLLER
Filed July 12, 1947  4 Sheets-Sheet 1
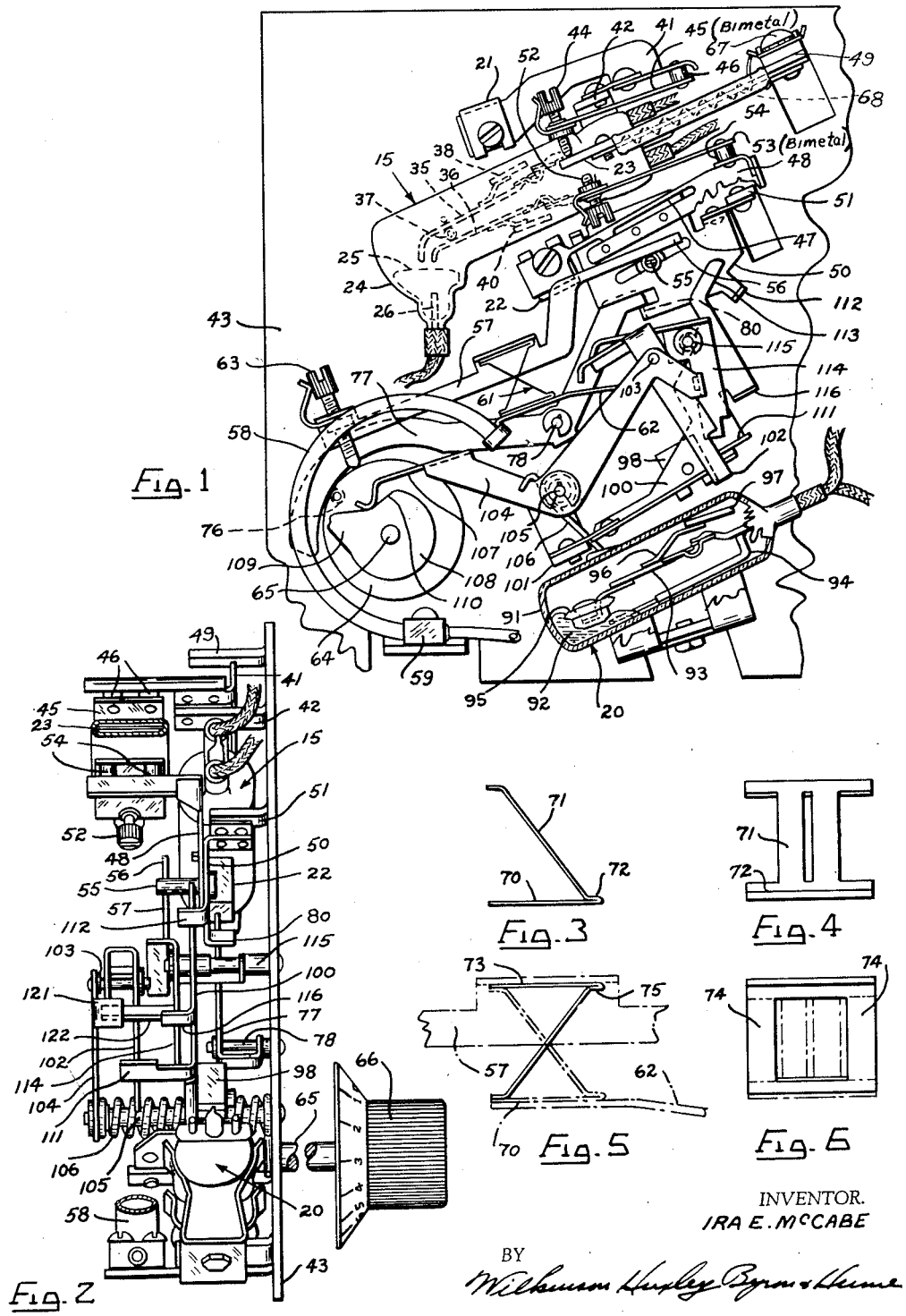
INVENTOR.
IRA E. McCABE
BY
Wilkinson Huxley Byron & Hume Feb. 5, 1952     I. E. McCABE     2,584,482
ELECTRIC REFRIGERATION AND DEFROSTER CONTROLLER
Filed July 12, 1947     4 Sheets-Sheet 2

INVENTOR.
IRA E. McCABE

Feb. 5, 1952     I. E. McCABE     2,584,482
ELECTRIC REFRIGERATION AND DEFROSTER CONTROLLER
Filed July 12, 1947     4 Sheets-Sheet 3
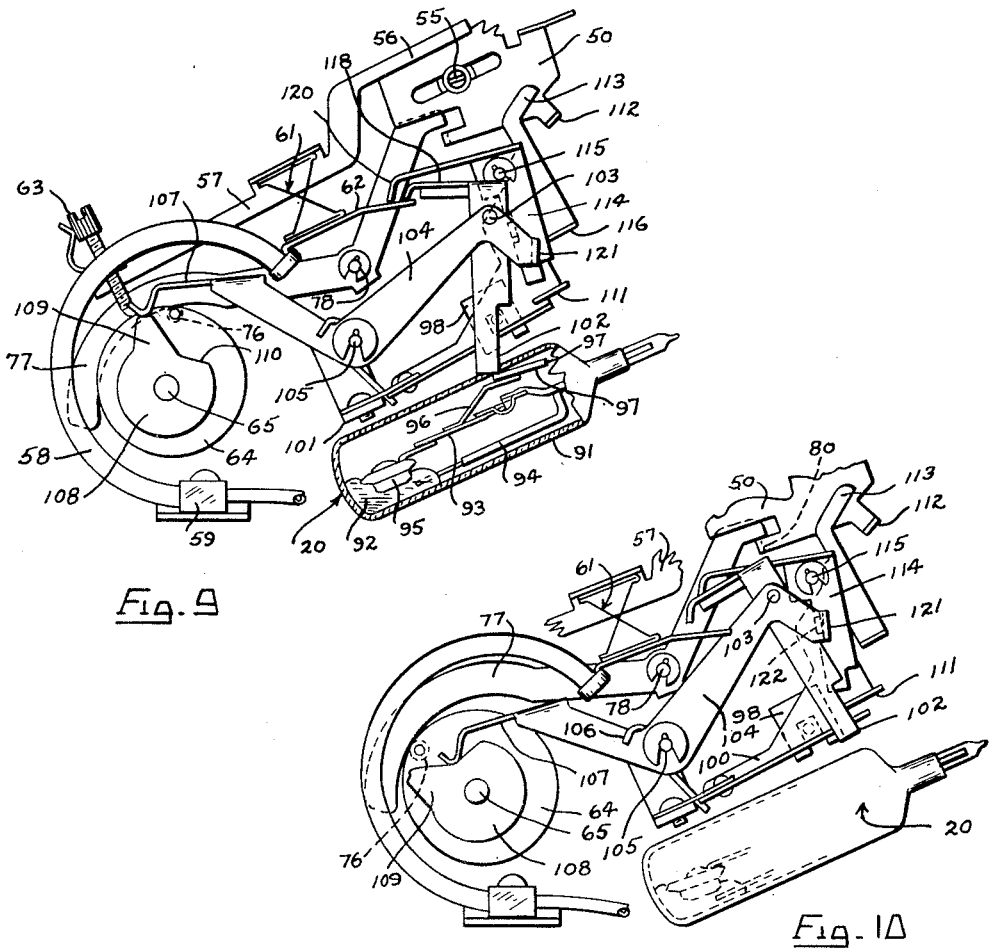
Fig. 9
Fig. 10
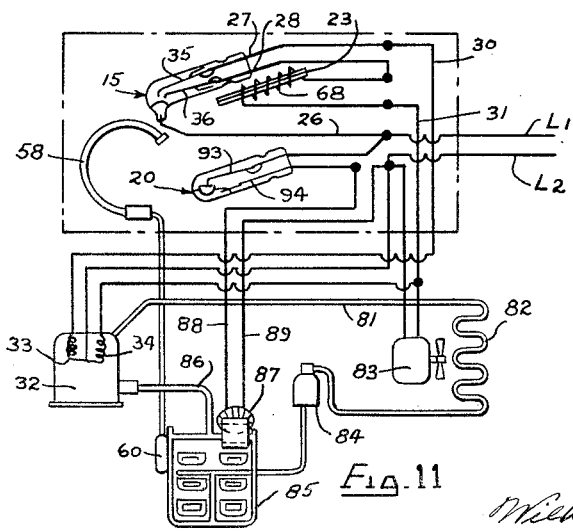
Fig. 11
INVENTOR.
IRA E. McCABE
BY Feb. 5, 1952 I. E. McCABE 2,584,482
ELECTRIC REFRIGERATION AND DEFROSTER CONTROLLER
Filed July 12, 1947 4 Sheets-Sheet 4

INVENTOR.
IRA E. McCABE
BY
Wilkinson Huxley Byron & Hume

Patented Feb. 5, 1952

2,584,482

UNITED STATES PATENT OFFICE 2,584,482

ELECTRIC REFRIGERATION AND DEFROSTER CONTROLLER

Ira E. McCabe, Chicago, Ill.

Application July 12, 1947, Serial No. 760,597

23 Claims. (Cl. 62—4)

1

The invention relates to the art of refrigeration control and has reference more particularly to refrigerators having electrically operated means for defrosting the evaporators thereof and to a circuit controller for selectively controlling the refrigerating and defrosting operations.

An object of the invention resides in the provision of an integral unitary structure embodying therein the desired requisites of control for domestic type electrical refrigerators in combination with electrical defrosting control and wherein the automatic devices regulating the refrigerating means are employed for automatically terminating a defrosting period while in progress.

Another object of the invention is to provide a refrigerator control in the form of a unitary structure having a temperature responsive device responsive to temperature changes within the cooling compartment of the refrigerator for controlling operation of the motor driven compressor whereby to maintain desired temperatures within the compartment; to provide in combination therewith automatic control for the starting and running windings of the compressor motor and which will operate to stop the motor in the event of an overload; to provide manually actuated means for rendering the automatic control inoperative independently of the action of the temperature responsive device; and to provide an electric switch for controlling the electrically operated defrosting means and which will have interlocking operation with the foregoing through the temperature responsive device and the said manual means.

Another and more specific object of the invention resides in the provision of refrigerator control structure as above described and wherein as a result of the interlocking operation of the defrosting switch with the refrigeration control the said manual means may be set to cause a closure of the defrosting switch and a locked-out open circuit position of the refrigeration control; wherein the said manual means may be employed when in the "off" refrigeration position to stop or prevent a defrosting operation; wherein the temperature responsive device may be employed to automatically terminate a defrosting operation during a period of defrosting when a predetermined temperature has been reached within the cooling compartment and to resume refrigeration thereafter; and wherein the said manual means may be set for a defrosting operation and subsequently moved to a desired refrigeration setting so that a predetermined stopping of the defrosting operation by the temperature responsive device is thereafter followed by refrigeration to

2 maintain the selected temperature in the cooling compartment.

With these and various other objects in view, the invention may consist of certain novel features of construction and operation, as will be more fully described and particularly pointed out in the specification, drawings and claims appended hereto.

In the drawings, which illustrate an embodiment of the invention and wherein like reference characters are used to designate like parts—

Figure 1 is an elevational view showing one embodiment of refrigeration control mechanism coming within the invention and wherein the operating structure is mounted upon the rear of a supporting panel with the elements of the structure assuming an inoperative position as a result of setting the manual control knob to "off" position;

Figure 2 is a view in side elevation of Figure 1 as viewed from the right thereof, showing the manual control knob extending from the front of the control panel and the operating structure extending from the rear of said panel;

Figure 3 is a view in end elevation of one element of a spring structure employed in the present control mechanism;

Figure 4 is a side view of Figure 3;

Figure 5 is a view similar to Figure 3 but showing another element of said spring structure and illustrating in dot and dash lines the position of the element of Figure 3 when assembled therewith;

Figure 6 is a side view of Figure 5 also showing in dot and dash lines the assembled relation therewith of the element of Figure 3;

Figure 9 is another fragmentary view of the control mechanism illustrating the position the parts assume upon termination of a defrosting operation by the temperature responsive means;

Figure 10 is a fragmentary view similar to Figure 9 but showing the effect of manually moving the control knob to "off" position following setting of the knob for a defrosting operation;

Figure 11 is a schematic wiring diagram illustrating the electrical connections between the switches of the control mechanism and the conventional elements of a domestic type refrigerator embodying one form of electrical defrosting means;

Figure 12:
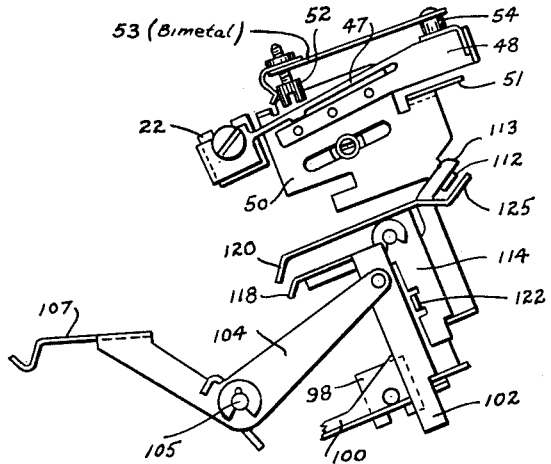
Figure 12 is a fragmentary view of a modified arrangement of operating parts which provide additional means for terminating the defrosting operation.
Figure 14:
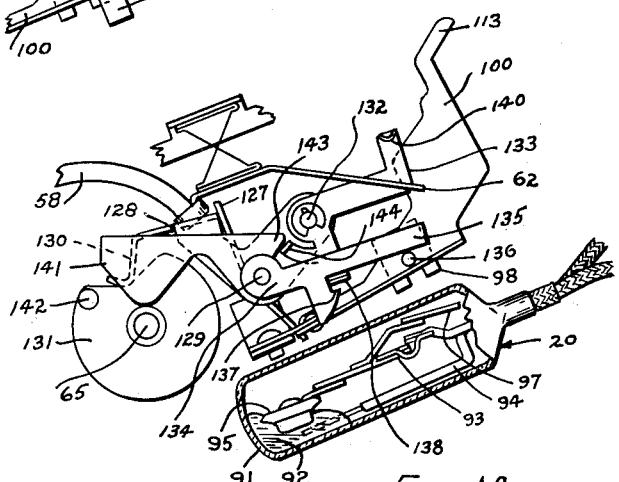
Figure 13:
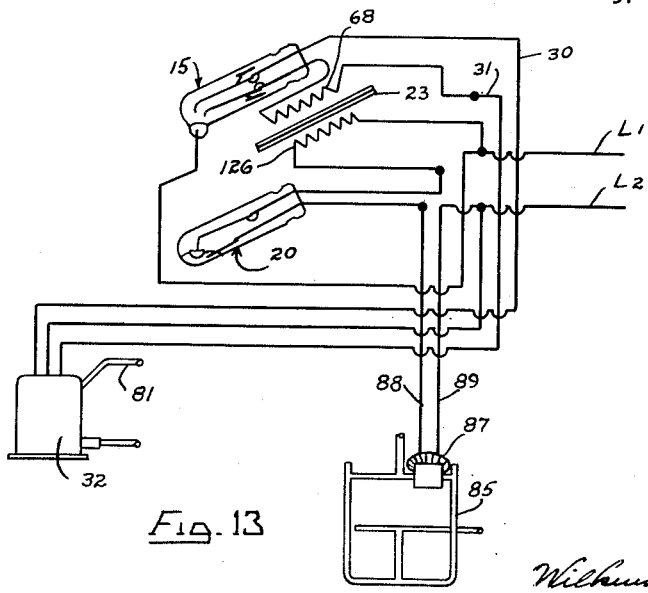

Figure 13 is a schematic wiring diagram illustrating a modification in the electrical connections wherein a second heater is provided for use in connection with the modified structure of Figure 12; and Figure 14 is still another fragmentary view showing a further modification in the construction and arrangement of the operating parts whereby manual closure of the defrosting switch and opening of the motor switch is accomplished together with maintenance of said switch positions until automatically or manually changed.

Figures 7, 8:
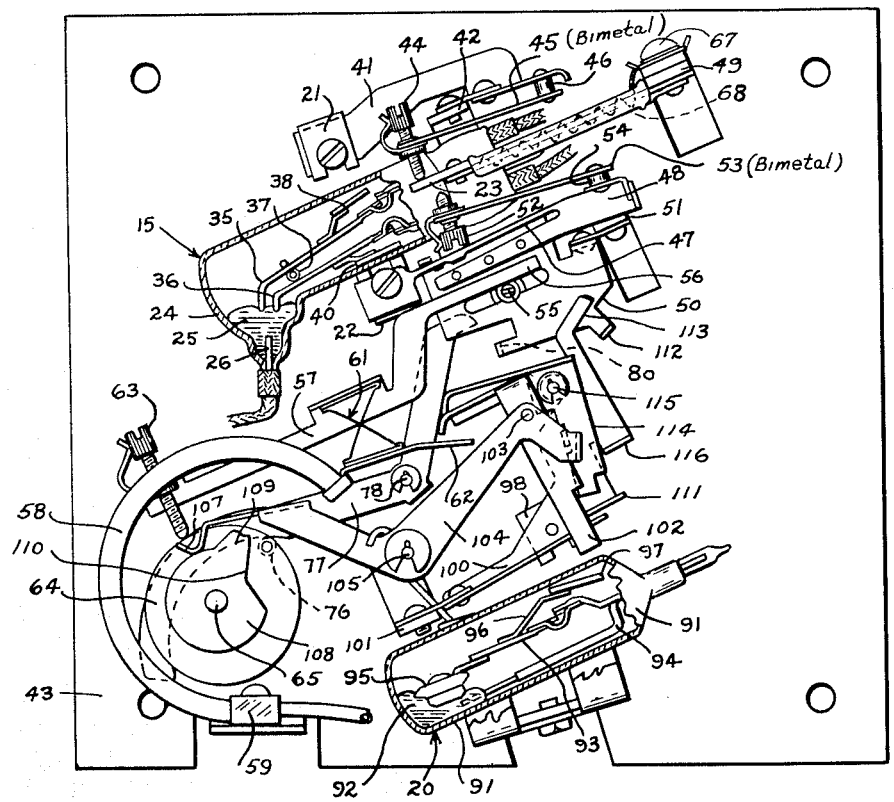
Figure 7 is a view similar to Figure 1 but showing the parts of the control mechanism in the position they assume upon manual setting of the control knob to an automatic refrigeration control position.
Figure 8 is a fragmentary view of the mechanism illustrating in particular the operating parts for defrosting, said parts being shown in the positions they assume upon manual setting of the control knob to defrost position.

Referring to the drawings, particularly Figures 1, 7 and 11 which illustrate an embodiment of refrigeration control mechanism coming within the invention, it will be seen that the same essentially includes a refrigeration control switch designated by numeral 15 and a defrost switch designated by numeral 20, both switches having magnets associated therewith for selectively actuating the contacts of the switch in a manner as will be explained in detail. The refrigeration control switch 15 is a multiple contact switch and with the associated magnets 21 and 22 and the electrothermal actuator 23 the same comprises an electrical control system of the type disclosed and claimed in my copending application Serial No. 744,643, filed April 29, 1947, now patent No. 2,539,259, and entitled Multiple Circuit Control Apparatus. In this form of motor controller the multiple contact switch is housed within a glass container or tube 24 closed at its lower end, which retains a small body of mercury or other electrical conducting fluid 25 having electrical connection with conductor 26 as shown in Figure 11. Said condutcor 26 is suitably connected to one terminal of a conventional source of electrical energy indicated by L1 and L2. The opposite end of tube 24 has sealed therein one or more lead-in wires 27 and 28, which wires connect with conductors 30 and 31, respectively, of the control circuit for the electrically operated refrigerant supply means. In this illustrated embodiment the electrically operated means for supplying refrigerant comprises a motor operator compressor 32, the motor of which is provided with a starting winding 33 and running winding 34. Said lead-in wires 27 and 28 hingedly support within the glass tube of the switch a pair of movable electrodes or contact members 35 and 36. The top electrode 35 is provided with a contact point for making and breaking its respective electric circuit with the pool of mercury 25, and the bottom electrode 36 is likewise provided with a contact point for making and breaking the electrical circuit connecting therewith. The members hingedly supporting the movable electrodes are fully explained in my copending application Serial No. 737,903, filed March 28, 1947, now Patent No. 2,562,626, and entitled Multiple Contact Switch Structure. Accordingly the top electrode 35 is spring tensioned in a downward direction and the bottom electrode 36 is spring tensioned in an upward direction whereby said electrodes are resiliently biased in opposed directions. Electrode 35 carries a member having an insulated leg 37 which is disposed between the electrodes to maintain them in spaced parallel relation. The electrodes are therefore electrically insulated from each other and an open circuit position is normally assumed by the electrodes as a result of said spring tensioning. A bracket fixed to movable electrode 35 carries at its free end the armature 38 disposed upwardly toward magnet 21. The movable electrode 36 is likewise provided with a bracket which carries the armature 40, the same being disposed downwardly toward magnet 22.

As best shown in Figures 1 and 7, the magnet 21 is fixed to arm 41 secured by a flat spring hinge connection to bracket 42 provided by the control panel 43. The hinged connection of arm 41 to its fixed support permits flexing movement of magnet 21 toward the switch structure, said movement, however, being controlled by the electrothermal actuator 23 which in its cold condition is adapted to contact the adjusting screw 44 carried by the bimetallic compensating arm 45 secured at 46 to arm 41. The electrothermal actuator 23 is supported from a bracket 49 mounted upon panel 43, which bracket carries a pair of insulated connectors 67 (one being shown in Figure 1) to which the terminals of an enclosed electric heater 68 are connected. The incorporation of this heater in the control circuit is shown in Figure 11. The lower magnet 22 is carried by resilient spring-like arm 47 forming a part of carrier plate 48 which is secured to and movable with an operating plate 50. Said plate 50 has a flat spring hinge connection to a fixed support 51 provided by the control panel. The magnet 22 is therefore capable of flexing movement toward the switch structure, said movement being limited under certain conditions by the electrothermal actuator 23 for which purpose the adjusting screw 52, Figure 2, is provided, the same being carried by the bimetallic compensating arm 53 secured at 54 to the carrier plate 48.

The operating plate 50 mounts a stud 55 made adjustable in a slot provided therefor in said plate. The stud is adapted to be engaged by the finger 56 provided by the right hand end of lever 57, which lever is actuated by the refrigeration temperature responsive device 58 in the form of a Bourdon tube suitably supported at 59 by a part of the control panel. The operating plate 50 through its spring hinge connection with bracket 51 is normally urged upward, which action tends to locate the lower magnet 22 into operative relation with armature 40 of the movable electrode 36, but under certain conditions within the cooling compartment of the refrigerator this action is restrained by engagement of lever 57 with stud 55. The refrigeration temperature responsive device 58 as shown is a Bourdon tube structure connected to a liquid charged system terminating in the bulb 60, Figure 11, adjacent the refrigerator evaporator whereby in the well known manner changes in temperature at the bulb will cause a change in the liquid charged system so as to create varying pressure conditions within the Bourdon tube to cause movement of its sealed free end.

Movement of the Bourdon tube 58 is transmitted to the lever 57 by means of a cross spring structure identified by numeral 61 which will be presently described in detail. Said cross spring structure is suitably secured at its bottom end to a supporting plate 62, which plate is fixed to and carried by the free end of the Bourdon tube.

The top of the cross spring structure 61 is secured to a section provided therefor by the lever 57. The left end of the lever 57 carries an adjusting screw 63 having engagement with a cam 64 mounted on shaft 65, which shaft is suitably journalled by the control panel 43 and extends so as to project from the front side of said panel, to which projecting end is fixed the manually actuated control knob 66. With the adjusting screw 63 in contact with the circumference of cam 64 and with the other extremity of arm 57, namely, finger 56, in contact with stud 55 the operating plate 50 will be depressed, locating the magnet 22 in an inoperative position with respect to said switch structure. However, upon expansion of the Bourdon tube 58 reflecting an increase in the temperature of the cooling compartment, the supporting plate 62 will be lifted to thereby elevate the cross spring structure 61, thus pivoting the lever 57 about its cam contacting screw 63 so that the finger end 56 is raised above stud 55 and the spring urged operating plate 50 is allowed to move upwardly. This upward movement of plate 50 effects movement of the magnet 22 into an operative position with respect to the switch structure, in which position of said magnet both electrodes 35 and 36 are caused to move downwardly to contact the mercury 25 and close their respective electric circuits. This action takes place because magnet 21 is sufficiently removed at this time to be nonoperative upon the upper armature 38 and since electrode 35 is spring urged downwardly it follows the lower electrode 36 into the mercury as the latter is actuated by magnet 22. As shown in Figure 11, said electric circuits include the starting and running windings 33 and 34 of the compressor motor which is thus energized to supply refrigerant for cooling purposes in a manner as is well known.

It will be understood by reference to Figures 1 and 11 that flow of the electric current in the running winding 34 will energize the resistance element 68 in series circuit relation with said running winding. Heat is generated by this element which influences the actuator 23, causing the same to bend or curve in a downward direction permitting the upper magnet 21 to move into operative position with respect to the electrode 35. When said magnet 21 is rendered effective upon the movable electrode 35 its armature 38 is attracted to withdraw the electrode from the mercury 25 thus interrupting the circuit to the starting winding 33. With the compressor motor having attained its running speed the current value in the running winding circuit is reduced, whereupon the actuator 23 will assume an intermediate position between adjusting screws 44 and 52 and magnet 21 is left in operative position to hold its movable electrode in an open circuit position. Should the compressor motor become overloaded for any reason so as to increase the current value in the running winding circuit the resistance element 68 will be heated to such an extent as to cause deflection of the actuator 23 downwardly into engagement with adjusting screw 52 and the lower magnet 22 is rendered inoperative. Upon withdrawal of magnet 22 from the switch structure the movable electrode 36 is released and the same moves upwardly to open the running winding circuit and operation of the compressor is stopped. Upon cooling of the resistance element 68 the actuator will move upwardly, releasing the lower magnet, permitting the same to become operative again. However, without the spring tensioning of the top electrode 35, at present magnetically held by magnet 21, the electrode 36 will not move into a circuit closing position since magnet 22 is not powerful enough without assistance from the said spring tensioning to attract said bottom electrode. Upon further cooling of element 68 the actuator 23 will contact the screw 44 and eventually magnet 21 will be lifted to an inoperative position. This action frees the top electrode and since its spring tensioning is now effective upon the bottom electrode, both electrodes will be caused to move downwardly by magnet 22 to thereby result in a reclosing of the starting and running winding circuits and operation of the compressor motor. The adjusting screws 44 and 52 carried by the respective arms of their associated magnets are adjustable so that delay in operation of the magnets due to deflection of the actuator 23 may be varied to secure operation of the electrodes 35 and 36, as herein described, with respect to the opening of the starting winding circuit and also the running winding circuit in the event of an overload.

The operating plate stud 55 being made adjustable with respect to its distance from the pivot point of the hinge connection 51, provides means for establishing the desired degree of movement required of the Bourdon tube 58 necessary to effect an opening and closing of the motor controlling circuits as a result of temperature changes, in other words, the temperature differential required for operation.

The adjusting screw 63 carried by the left end of lever 57 and cooperating with cam 64 affords means for calibrating the movement of the Bourdon tube to the temperature markings on the control knob 66 whereby throughout various positions of the cam, as adjusted by the control knob, the degree of temperature indicated by the markings for a chosen setting will operate the movable electrode to initiate refrigeration operation. As will be apparent, engagement of the adjusting screw 63 with the high portion of cam 64 will move the finger end 56 of lever 57 about its cross spring pivot 61 and effect movement of the lower magnet 22 by reason of contact with stud 55. For the highest spots on cam 64 the operating plate 50 will be moved downwardly and thus the magnet 22 will be moved its maximum distance from the switch structure, whereby the cooling compartment of the refrigerator will be maintained at the highest refrigerating temperature, maximum movement of the Bourdon tube being required to close the motor circuits and start operation of the compressor motor. Conversely, if the adjusting screw 63 is caused to contact the low portions of the cam 64, lever 57 will be rocked about its cross spring pivot 61 in a counter-clockwise direction, releasing finger 56 from contact with stud 55, and the lower magnet 22 will assume a closer position with the switch structure, whereby the coldest temperature will be maintained in the cooling compartment since less expension of the Bourdon tube is necessary to effect refrigeration operation.

In mounting the lower magnet 22 upon a resilient arm 47 forming a section of carrier plate 48, structure is provided which assures a positive quick closure of the controller circuits. As the magnet approaches the switch structure and its magnetic field begins to attract armature 40 of the lower electrode 36, the resiliency of the mounting for the magnet permits a degree of movement of the same beyond that permitted by arm 57, thus causing a quick and positive operation at the stage where the movable electrodes are close to contacting the mercury. Therefore, a positive immersion of the movable electrodes in the mercury is effected at the closing operation of the switch structure which is desirable when starting the compressor motor.

The cross spring structure 61 comprises two elements, the one shown in Figures 3 and 4 including a base member 70 having a twin webbed center section 71 bent back upon the base as at 72 and inclined upwardly at an angle to constitute one leg of the letter X. The free end of the leg is widened out near its end equal in width to that of the base, as clearly shown in Figure 4. The second element of the spring shown in Figures 5 and 6 includes a top member 73 of the same dimensions as the bottom member but having a pair of webbed end sections 74, one being located adjacent each side. The webbed end sections are bent back upon the top member as at 75 to constitute the other leg of the structure. A spring hinge is thus formed providing relative movement of one section with respect to the other about a point substantially on the lines of intersection of the X.

Referring again to Figure 1, cam 64 carries a pin 76 extending rearwardly and adapted to engage a lever 77 pivoted for rocking movement about a pivot post 78. The lever extends from both sides of its pivot point but to a greater extent on the left so as to normally cause, by excess weight on this end of the lever, the elevation of its right hand end. Movement in a downward direction of the left end is arrested by its engagement with pin 76. The operating plate 50 has a section of its lower left hand corner sheared and bent backward to provide a projection 80 adapted to be engaged by the right hand end of lever 77 which extends over and above the projection for the purpose. With cam 64 positioned by control knob 66, as shown in Figure 1, the pin 76 is caused to ride under the arcuate left hand end of lever 77, resulting in a lowering of the right hand end, which downward movement thereof effects engagement with projection 80. Pressure on said projection 80 in a downward direction will flex the operating plate 50 about its spring hinge connection and the lower magnet 22 will be moved and held in an inoperative position. By manual setting of the control knob 66 refrigeration is thus terminated and the control will remain in this position until the knob is again set for automatic operation.

Figure 7 illustrates the setting of cam 64 to a position where refrigeration may take place and where the same is automatically controlled to maintain low refrigerating temperature in the cooling compartment. Cam 64 has been rotated to locate pin 76 where it does not engage lever 77 and this freeing of said lever removes its right hand end from engagement with projection 80 on operating plate 50. Also the Bourdon tube 58 has expanded as a result of an increase in temperature within the cooling compartment of the refrigerator to elevate lever 57, which movement is followed by operating plate 50, thus placing the lower magnet 22 in an operative position with the switch structure to effect a closing of the compressor motor circuits.

As illustrated in Figure 11, the motor driven compressor 32 includes an induction motor having the starting and running windings 33 and 34, respectively, and said compressor through conduit 81 supplies compressed gaseous refrigerant to the condenser 82 cooled by fan 83. From the condenser the liquid refrigerant is delivered to a receiver 84 which supplies said refrigerant to the evaporator 85. The conduit 86 connects the evaporator with the compressor and said conduit returns to the compressor the gaseous refrigerant which completes the cycle. As disclosed in my Patent No. 2,495,378, granted January 24, 1950, and entitled Novel Means for and Method of Conditioning Refrigerating Systems the evaporator 85 is included in the construction of a transformer wherein the evaporator becomes the secondary of the transformer so that upon energization of the primary winding 87 of the transformer there is iinduced in the evaporator a low voltage current which raises the temperature of the evaporator for the purpose of removing frost and ice therefrom.

Conductors 88 and 89 comprise the primary circuit connecting with the transformer primary winding and it will be observed from Figure 11 that conductor 89 has electrical connection with terminal L₂, whereas conductor 88 has connection with terminal L₁ through the electric switch 20. Said switch is a single pole magnetically actuated enclosed mercury switch which normally assumes an open circuit position in the primary winding of the defrosting transformer. The cylindrical glass tube or container 91, Figures 1, 7 and 8, is closed at its lower end for receiving and retaining a small body of mercury or other electrical conducting fluid 92. The upper end of the tube is closed and a pair of lead-in wires are sealed in said end for supporting within the container the movable electrode 93 and the stationary electrode 94. Said electrode 94 extends into and has electrical connection with the pool of mercury 92, whereas, the movable electrode 93 is provided with a cup 95 of arc resisting insulating material and which retains some mercury in electrical contact with said electrode which is fixed to the base of the cup within the same. The bracket 96, secured to electrode 93, carries the armature 97 which is actuated by magnet 98 for opening and closing the electric circuit through the electrodes. Said magnet is mounted upon a carrier plate 100 which is spring supported by a flat spring secured to fixed support 101 provided by the control panel. Said spring support normally urges the carrier plate 100 and thus the magnet 98 in a direction away from operative relationship with the defrost switch 20.

To close switch 20 a push plate 102 is pivotally mounted at 103 upon an operating arm 104, which in turn is pivotally mounted by the post 105. The arm 104 is normally urged by a coil spring 106, Figure 2, in a direction to elevate the right hand end of the arm and with it the push plate 102. The left hand end of operating arm 104 is extended by the member 107 to provide a cam follower adapted to ride on a second cam 108 fixed to shaft 65 rotated by the manual control knob 66. Cam 108 has a fixed relationship with cam 64 and it will be observed that said cam 108 is provided with a projection 109 and a notch 110 which are effective for determining the position of the operating arm 104. When the control knob has been rotated to "off" position to discontinue refrigeration, as shown in Figure 1, the depression 110 in cam 108 receives the cam follower 107 which locates the operating arm 104 in a position to prevent a defrosting operation or to stop such operation, if in progress, all as will be later explained in detail. Upon rotation of the control knob to "defrost" position the cam follower 107 is positioned on projection 109 of cam 108, as shown in Figure 8, which has the effect of rocking operating arm 104 clockwise which lowers push plate 102 to engage projection 111 extending from carrier plate 100. As a result the carrier plate is flexed about its hinge support, locating the magnet in operative position with respect to the defrost switch, and accordingly armature 97 is attracted and movable electrode 93 is immersed in mercury 92 to close the primary winding to the defrosting transformer. The high and low portions on cam 108 adjoin one another and it will be seen that the remainder of the periphery of said cam is uniform and this part of the cam imparts no movement to the operating arm 104.

To render the refrigeration controller inoperative during a defrosting operation the operating plate 50 is provided with a projection 112, Figures 7 and 8, adapted to be engaged by an extension member 113 of the magnet carrier plate 100 when the latter is moved to a defrost position. Engagement of extension member 113 with 112 has the effect of lowering the operating plate 50 about its hinge support to an extent to render inoperative the lower magnet 22. Since the invention contemplates a termination of the defrosting operation by the refrigeration temperature responsive device, that is, the Bourdon tube 58, and since it is also desired to go from a manually set defrost position to a refrigeration setting, the latter to become automatically effective after a period of defrosting, a defrost lock is provided which is rendered immediately effective upon closing of the defrost switch 20. Said lock comprises a pivoted arm 114, pivoted upon a post 115 provided by the control panel. The arm is so disposed as to maintain one edge thereof in contact with a second projection 116 extending from carrier plate 100, said arm having a notch formed in its lower end adapted to receive said projection 116 when the same is moved with carrier plate 100 to a defrost position. Thus upon manually setting to a defrosting position, as shown in Figure 8, the arm 114 will permit defrosting to take place and during this operation a resetting of the control knob 66 may be made to a desired refrigeration temperature without terminating the defrosting operation since the parts are held in position as shown in Figure 8 by the locking action of arm 114. The defrosting operation is terminated automatically by the temperature responsive device 58 and thereafter refrigeration is resumed so that the cooling compartment of the refrigerator is maintained at a temperature predetermined by the setting of the control knob.

Figure 9 illustrates the operation of a temperature responsive device to terminate the defrosting operation and resume refrigeration. As shown in said figure, the supporting plate 62 for the cross spring structure 61 is extended for location below a pair of fingers 118 and 120 which are fixed to the push plate 102 and the lock arm 114, respectively. The supporting plate 62 and the fingers may be adjusted relative to each other so that with the parts assuming the positions of Figure 8 and a predetermined temperature existing in the refrigerating compartment, which is effective upon the bulb 60, the Bourdon tube in expanding in response thereto will raise the supporting plate 62 to contact the fingers 118 and 120. This upward movement of the supporting plate in contacting the fingers will be sufficient to rock the push plate 102 and the lock arm 114 in a clockwise direction whereby to release the magnet carrier plate 100 and remove magnet 98 from operative relation with the defrost switch. The movable electrode 93 of said switch thereupon moves to its open position, opening the transformer primary circuit so that the defrosting operation is terminated. This action of the push plate 102 and lock arm 114 in releasing the magnet carrier plate 100 also operates to release the operating plate 50 so that the lower magnet 22 is rendered operative to attract the movable electrodes 35 and 36 whereupon the compressor motor is energized and refrigeration is automatically resumed. As shown in Figures 8 and 9, the cam 108 is located with projection 109 in contact with cam follower 107. This position of cam 108 also determines the position of cam 64 so that the refrigeration automatically taking place following a defrosting operation will be controlled by this setting of the cam. Had the control knob been reset during the defrosting operation to another refrigeration setting the arm 104 would free the push plate 102 from engagement with the carrier plate 100 which, however, remains in its operative position by virtue of the locking action of arm 114. Upon the termination of a defrosting operation by the temperature responsive means as described, refrigeration is resumed at the desired temperature for which cam 64 may have been set.

If for any reason after setting the control knob 66 to a "defrost" position it should be desired, before the temperature responsive device acts to terminate defrosting, to manually shut down the refrigerator by positioning the control knob to "off" position, means are provided to release the lock arm 114 when the knob is so positioned. Referring to Figure 10, the cam 108 is shown in "off" position. Pin 76 on cam 64 has contacted lever 77 to rotate said lever about its pivot whereby its right hand end is lowered to lock out the operating plate 50 by virtue of contact of the right hand end of arm 77 with projection 80. The depression in cam 108 is so positioned with respect to pin 76 that in the "off" position the cam follower 107 of defrosting operating arm 104 is caused by the coil spring 106 to enter the depression whereby the end carrying the pivot 103 is raised. The end of arm 104 adjacent pivot 103 is extended obliquely to the right, terminating in a bent back segment 121, Figures 2 and 10. The lock arm 114 is provided with a laterally extending finger 122 located in the path of segment 121 and engaged thereby when the later is moved by raising arm 104. Thus with the defrost switch 20 closed by setting the cam 108 to "Defrost," as shown in Figure 8, a rotation of the control knob thereafter to "off" position, as shown in Figure 10, will remove push plate 102 from engagement with carrier plate 100 and unlock arm 114 from said plate 100 whereby the spring urged carrier plate is freed to move upwardly and lift magnet 98 from operative relation with defrost switch 20. Although operating plate 50 has been released by removal of extension member 113 from projection 112 the said plate remains inoperative by reason of the lock-out effect of lever 77 in contacting projection 80.

Figures 12 and 13 illustrate a modification of the operating structure whereby additional means are provided, or which may be employed as the sole means, in conjunction with the temperature responsive Bourdon tube to bring about unlocking of the magnet carrier plate 100 and thus opening of defrost switch 20 to terminate a defrosting operation. As shown in Figure 12, the lock arm 114 is provided with an extension 125, the same comprising a continuation of the finger 120 and extending in a direction to the right a distance so as to be located under projection 112. Said projection is modified so that the same is of such length as to engage extension 125 upon downward movement of the operating plate 50. Also in this modification the finger 122 on lock arm 114 is extended for engagement with the push plate 102 when the lock arm is rocked in a clockwise direction. In the event plate 50 is moved about its hinge support 51 to cause engagement of projection 112 with extension 125 when the lock arm 114 is operative to hold the magnet carrier plate 100, a continued movement of plate 50 will cause finger 122 on the lock arm to engage the push plate, and as a result of movement being applied to said lock arm and push plate the magnet carrier plate 100 is released and the defrost switch 20 opens.

As shown in Figure 13, a second resistance element 126 is provided in the circuit of primary winding 87 of the defrost transformer whereby energization of this second resistance element for a predetermined time will produce sufficient heat to cause deflection of the actuator 24 in a direction toward the lower magnet 22. Continued heating of this second resistance element will result in contact of the actuator 23 with adjusting screw 52 and downward pressure upon said screw will impart movement to plate 50 about its hinge connection 51 to thus effect a termination of a defrosting operation in a manner as above described.

The modifications shown and described in connection with Figures 12 and 13 may be employed as the sole means for terminating a defrosting operation or this modified structure may be employed in combination with the temperature responsive Bourdon tube as a safety means having operation in the event the Bourdon tube should fail to function. Failure of the Bourdon tube may result from a leak in the charged system of the tube whereby it would not be responsive to temperature conditions of the cooling compartment.

Figure 14 illustrates a further modification relating primarily to the defrosting mechanism, the parts of which have been rearranged and have a mode of operation different from that described with respect to Figure 1. In this modification the defrosting arm 128 is pivoted on post 129 and the left hand end of said arm is provided with a cam follower 130. The spring 127 maintains the cam follower in contact with the periphery of cam 131 fixed to control shaft 65 and which cam is thus rotated manually by the control knob 66. The right hand end of arm 128 is extended beyond pivot 129 in an angular direction upwardly and this angular extension carries a pivot 132. The locking member 133 is supported by said pivot for rotation on this part of operating arm 128. A push plate 134 is also mounted for rotation on post 129 and said plate is provided with a finger 135 adapted to engage pin 136 fixed to the magnet carrier plate 100. Said plate carries the magnet 98 and the same is hingedly supported, as previously described, from a bracket provided by the control panel. Said push plate is also formed with a notch 137 into which the pawl 138 projecting from locking member 133 normally enters. As the said cam 131 is rotated so that the cam follower 130 rides on the curved periphery of the cam the operating arm 128 is rocked clockwise to lower pivot 132 and the locking member 133 so that its pawl 138 will engage the bottom of the push plate notch 137. Said downward movement of locking member 133 will rotate push plate 134 and as a result finger 135, by its engagement with pin 136, will effect downward movement of the magnet carrier plate 100, thus locating the defrost magnet in operative relation with the defrost switch 20. The armature 97 of said switch is attracted to cause a closing of the transformer primary winding circuit and the starting of a defrosting operation. Said defrosting operation will continue until the Bourdon tube 58 expands to elevate supporting plate 62 and cause engagement of said plate with finger 140 fixed to the locking member 133. As upward movement of the supporting plate 62 continues, its contact with finger 140 will rotate the locking member counter-clockwise to remove the pawl 138 from engagement with the notch 137, eventually freeing the push plate so that the magnet carrier plate 100 is also free to move upwardly and locate magnet 98 away from defrost switch 20. By expansion of the Bourdon tube 58 the parts are actuated to terminate the defrosting operation and which action takes place upon a predetermined temperature being reached in the cooling compartment of the refrigerator.

To manually release the locking member 133 when the switch 20 is closed, or to prevent closure of said switch upon certain manipulations of the cam 131 when refrigeration is desired, a lock release lever 141 is mounted for rotation on pivot post 129. The lever extends to the left of said post and terminates in a manner whereby a pin 142 carried by cam 131 may engage said lever and upon rotation of the cam will raise the lever, rocking the same clockwise about its pivot. Adjacent said pivot the lever is provided with an abutment 143 adapted to engage a projection 144 extending laterally from locking member 133 into the path of said abutment. When the parts are brought into engagement and lever 141 is rotated the pawl 138 is moved out of the notch 137, freeing the push plate 134 and thus the magnet carrier plate 100. In this modification the extension member 113 on the carrier plate performs the same function as in the embodiment of Figure 1, namely, to control the switch structure for the motor compressor with respect to the defrost switch.

In view of the foregoing, it will be appreciated that the present invention provides a novel unitary structure having operation to control the compressor motor of an electrically operated refrigerator and wherein electrically operated defrosting means are also controlled by interlocking coaction of certain parts of the respective mechanisms. The electrical method of effecting defrosting is a preferred form and here it will be recognized that other systems may be employed and controlled by the defrost switch 20, the automatic control of said switch, to open the same and terminate defrosting, being, as disclosed herein, the defrosting condition responsive means, comprising either the temperature responsive Bourdon tube device, the time device as represented by the electro-thermal element of Figure 13, or the combination of both.

The invention is not to be limited to or by details of construction of the particular embodiment thereof illustrated by the drawings as various forms of the device will of course be apparent to those skilled in the art without departing from the spirit of the invention or the scope of the claims.

What is claimed is:
1. In refrigeration control mechanism, the combination of a refrigerant circulatory system including a cooling unit, refrigerant supply means therefor, electrical defrosting means including a transformer having a primary winding and embodying said cooling unit as the secondary winding, control mechanism having a plurality of control positions in one of which the supply means is rendered inoperative and the defrosting means is rendered operative by energization of the primary winding, and automatic means responsive to a defrosting condition and operative, when a predetermined condition exists, to render said defrosting means inoperative and said supply means operative.

2. In refrigeration control mechanism, the combination of a refrigerant circulatory system including a cooling unit, refrigerant supply means therefor, electrical defrosting means including a transformer having a primary winding and embodying said cooling unit as the secondary winding, control mechanism having a plurality of control positions in one of which the supply means is rendered inoperative and the defrosting means is rendered operative by energization of the primary winding, and a condition responsive device effecting actuation of the control mechanism in response to certain conditions of the cooling unit, said device, when said defrosting means is operative, being responsive to a predetermined condition of the cooling unit for rendering the defrosting means inoperative by deenergizing the primary winding and rendering the supply means operative.

3. In refrigeration control mechanism, the combination of a refrigerant circulatory system including a cooling unit, means for supplying refrigerant thereto, electrical defrosting means associated with said unit, an electric circuit for the refrigerant supply means including a switch in the circuit, an electric circuit for the defrosting means including a switch in the circuit, actuating means for said switches respectively, operating members for said actuating means, a condition responsive device responsive to conditions of the cooling unit for controlling through said operating members the actuating means for the supply means switch, said operating members including a cam follower and locking means, and a manually operable cam engageable with the cam follower, said cam having a position whereby said cam follower and locking means are operable to lock said actuating means to close the defrosting means switch and open the supply means switch.

4. In refrigeration control mechanism, the combination of a refrigerant circulatory system including a cooling unit, means for supplying refrigerant thereto, electrical defrosting means associated with said unit, an electrical circuit for the refrigerant supply means including a switch in the circuit, an electric circuit for the defrosting means including a switch in the circuit, actuating means for said switches respectively, operating members for said actuating means including cam contacting means, a manually operable cam engageable by the cam contacting means, said cam having a position whereby the operating members are operable to position both said actuating means to close the defrosting means switch and open the supply means switch, locking means associated with said operating members effective to lock the actuating means when located in their cam actuated position, and a condition responsive device operable in response to a predetermined condition of the cooling unit to unlock said locking means to allow the defrosting means switch to open and the supply means switch to close.

5. Refrigeration control mechanism as defined by claim 4 additionally including a lock releasing member, said manually operable cam having a second position whereby to actuate said lock releasing member to render the locking means non-locking and allow the defrosting means switch to open, a movable member, a second manually operable cam, means carried by said second cam for moving said movable member in a certain direction, and said actuating means for the supply means switch including a part engageable by said movable member when moved in said direction by the second cam to hold the actuating means in an inoperative position whereby the supply means switch is maintained open.

6. In refrigeration control mechanism, the combination of a refrigerant circulatory system including a cooling unit, electrical motor means for supplying refrigerant thereto, electrical defrosting means associated with said unit, an electric circuit for the refrigerant supply means including a magnetically actuated switch in the circuit, an electric circuit for the defrosting means including a magnetically actuated switch in the circuit, magnetic actuating means for said switches respectively, operating members for said actuating means including cam contacting means, a manually operable cam engageable by the cam contacting means, a condition responsive device responsive to conditions of the cooling unit, said device, when said cam is located in one position, controlling through said operating members the actuating means for the supply means switch, said cam having a second position wherein the operating members are operable to position both said actuating means so as to close the defrosting means switch and open the supply means switch, and locking means associated with said operating members effective to lock said actuating means when located in their second cam actuated position, said condition responsive device being operable in response to a predetermined condition of the cooling unit to unlock said locking means to allow the defrosting means switch to open and the supply means switch to close.

7. In refrigeration control mechanism, the combination of a refrigerant circulatory system including a cooling unit, electrical motor means for supplying refrigerant thereto, electrical defrosting means including a transformer having a primary winding and embodying said cooling unit as a secondary winding, an electric circuit for the refrigerant supply means including a switch in said circuit, an electric circuit for said transformer including a switch in series relation with the primary winding thereof, temperature responsive means responsive to the temperature of the cooling unit for controlling the supply means switch, control mechanism providing actuating means for the primary winding switch and having a plurality of control positions in one of which the supply means switch is open and the primary winding switch is closed, and means associated with said control mechanism for holding said actuating means with the primary winding switch closed, said temperature responsive means being operable at a predetermined temperature of the cooling unit to effect release of said holding means from a holding position whereby said primary winding switch is opened and the supply means switch is closed.

8. In refrigeration control mechanism as defined by claim 7, additionally including independent means for releasing the holding means, said independent means including an electrothermal actuator responsive to current flowing in said primary winding circuit.

9. In refrigeration control mechanism, the combination of a refrigerant circulatory system including a cooling unit, means for supplying refrigerant thereto including an electric circuit controlled by a switch, electrical defrosting means associated with said cooling unit and including an electric circuit controlled by another switch, operating members for the switches respectively and having an operative and inoperative position with respect thereto whereby said switches are open or closed depending on the position of their operating member, a temperature responsive device responsive to the temperature of the cooling unit, an operator connecting said device with said operating member for the supply means switch whereby said switch is controlled in response to the temperature of the cooling unit, and cam means having a plurality of positions, said operator being actuated by said cam means whereby rotation of the cam means to various positions will vary the operative relationship between the device and the operating member to thereby determine the conditions in response to which the said device through said operator will effect operation of the supply means switch.

10. In refrigeration control mechanism, the combination of a refrigerant circulatory system including a cooling unit, means for supplying refrigerant thereto including an electric circuit controlled by a switch, electrical defrosting means associated with said cooling unit and including an electric circuit controlled by another switch, operating members for the switches respectively and having an operative and inoperative position with respect thereto whereby said switches are open or closed depending on the position of their operating member, a temperature responsive device responsive to the temperature of the cooling unit, an operator connecting said device with said operating member for the supply means switch whereby said switch is controlled in response to the temperature of the cooling unit, cam means having a plurality of positions, said operator being actuated by said cam means whereby rotation of the cam means to various positions will vary the operative relationship between the device and the operating member to thereby determine the conditions in response to which the said device through said operator will effect operation of the supply means switch, a second operator actuated by said cam means for controlling the operating member for the defrosting means switch, said cam means in one position rendering the said operating member operative to close the defrosting means switch, and means having interlocking relation with said operating members whereby with the defrosting means switch closed the supply means switch is maintained open.

11. In refrigeration control mechanism, the combination of a refrigerant circulatory system including a cooling unit, means for supplying refrigerant thereto, electrical defrosting means associated with said unit, an electric circuit for the refrigerant supply means including a magnetically actuated switch in the circuit, an electric circuit for the defrosting means including a magnetically actuated switch in the circuit, first and second movable magnetic operating means for said switches respectively normally urged to cause closing of the supply means switch and opening of the defrosting means switch, automatic condition responsive means for controlling the positions of the first movable magnetic operating means, said condition responsive means under one condition operating to permit said first magnetic means to assume its normally urged operating position and under another condition operating to position the first magnetic means to cause opening of the supply means switch, and manually operable means adapted to actuate both movable magnetic means to move the same to cause opening of the supply means switch and closing of the defrost means switch.

12. In refrigeration control mechanism as defined by claim 11, additionally including means holding the second magnetic operating means in the manually actuated position, means associated with the condition responsive means and having operating engagement with the holding means to cause the holding means to release the second magnetic means when a predetermined condition occurs, whereby both magnetic means may return to their normally urged positions.

13. In refrigeration control mechanism, the combination of a refrigerant circulatory system including a cooling unit, electrical motor means for supplying refrigerant thereto, an electric circuit for the refrigerant supply means including a magnetically actuated switch in the circuit, magnetic actuating means for the supply means switch, other magnetic actuating means having an operative and inoperative position for controlling operation of a defrosting switch, operating members for said magnetic actuating means respectively including cam contacting means, a manually operable cam engageable by said cam contacting means, a condition responsive device responsive to conditions of the cooling unit, said device, when said cam is located in one position, controlling through said operating members the magnetic actuating means for the supply means switch, said cam having a second position wherein the operating members position the magnetic actuating means for the supply means switch to open said switch and are caused to operatively position the magnetic actuating means for the defrosting switch, and locking means associated with said operating members effective to lock both said actuating means when located in their second cam actuated position, said condition responsive device being operable in response to a predetermined condition of the cooling unit to unlock said locking means whereby to allow the supply means switch to close and to render the magnetic actuating means for the defrosting switch inoperative.

14. In refrigeration control mechanism, the combination of a refrigerant circulatory system including a cooling unit, means for supplying a refrigerant thereto, electrical defrosting means associated with said unit, an electric circuit for the refrigerant supply means including a switch in the circuit, an electric circuit for the defrosting means including a normally open switch in the circuit, temperature responsive means responsive to temperature conditions of the cooling unit for controlling the supply means switch, manual means for setting the temperature responsive means at a selected temperature for maintaining the cooling unit at said temperature, actuating means for closing the defrosting switch and having operation to open the supply means switch when the defrosting switch is closed thereby, said actuating means normally having operation in response to movement of the manual means, and holding means for holding the defrosting switch closed and the actuating means inoperative, whereby the manual means may be moved to change the setting of the temperature responsive means without operating the actuating means.

15. Refrigeration control mechanism as defined by claim 14, wherein said temperature responsive means has operation to release the holding means upon the cooling unit attaining a predetermined temperature whereby to terminate the defrosting operation by freeing the defrosting switch so that the same may return to open position.

16. Refrigeration control mechanism as defined by claim 14, additionally including a release member actuated by the manual means in one position thereof to provide a manual release of the holding means thereby freeing the defrosting switch so that the same may return to open position.

17. In refrigeration control mechanism, the combination of a refrigerant circulatory system including a cooling unit, means for supplying a refrigerant thereto, electrical defrosting means associated with said unit, an electric circuit for the refrigerant supply means including a switch in the circuit, an electric circuit for the defrosting means including a normally open switch in the circuit, temperature responsive means responsive to temperature conditions of the cooling unit for controlling the supply means switch, manual means for setting the temperature responsive means at a selected temperature for maintaining the cooling unit at said temperature, actuating means for closing the defrosting switch and having operation to open the supply means switch when the defrosting switch is closed thereby, said actuating means normally having operation in response to movement of the manual means, holding means for holding the defrosting switch closed and the actuating means inoperative, whereby the manual means may be moved to change the setting of the temperature responsive means without operating the actuating means, said temperature responsive means having operation to release the holding means upon the cooling unit attaining a predetermined temperature whereby to terminate the defrosting operation by freeing the defrosting switch so that the same may return to open position, and a separate release member actuated by the manual means in one position thereof to provide a manual release of the holding means to also free the defrosting switch.

18. In refrigeration control mechanism, the combination of a refrigerant circulatory system including a cooling unit, means for supplying a refrigerant thereto, an electric circuit for the refrigerant supply means including a switch in the circuit, temperature responsive means responsive to temperature conditions of the cooling unit for controlling the supply means switch, manual means for setting the temperature responsive means at a selected temperature for maintaining the cooling unit at said temperature, actuating means having operation to open the supply means switch, said actuating means normally having operation in response to movement of the manual means, holding means for holding the supply means switch open when actuated to open position by the manual means, whereby the manual means may be moved to change the setting of the temperature responsive means without operating the actuating means, and said temperature responsive means having operation to release the holding means upon a predetermined increase in temperature of the cooling unit to allow the supply means switch to close and which is thereafter controlled by said temperature responsive means.

19. Refrigeration control mechanism as defined by claim 18 including a separate release member actuated by the manual means in one position thereof to provide a manual release of the holding means.

20. Refrigeration control mechanism as defined by claim 18 including a second actuating means for the supply means switch having operation in response to a predetermined setting of the manual means to render the supply means switch inoperative and non-responsive to the temperature responsive means.

21. Refrigeration control mechanism as defined by claim 18, additionally including a separate release member for releasing the holding means when actuated, a second actuating means for the supply means switch having operation to open said switch and to render it non-responsive to temperature responsive means, said separate release member and second actuating means performing their operations in response to movement of the manual means to a predetermined position.

22. In refrigeration control mechanism, the combination of a refrigerant circulatory system including a cooling unit, means for supplying a refrigerant thereto, electrical defrosting means associated with said unit, an electric circuit for the refrigerant supply means including a switch in the circuit, an electric circuit for the defrosting means including a switch in the circuit, temperature responsive means responsive to temperature conditions of the cooling unit for controlling the supply means switch, actuating means for the defrosting switch having operation to open the supply means switch with the closing of the defrosting switch, means for holding said actuating means to hold the defrosting switch closed, said temperature responsive means being operable at a predetermined temperature to release said holding means from a holding position, and independent means for also releasing the holding means, siad independent means including an electrothermal actuator responsive to current flowing in the electric circuit for the defrosting means.

23. In refrigeration control mechanism, the combination of a refrigerant circulatory system including a cooling unit, means for supplying refrigerant thereto, electrical defrosting means associated with said unit, an electric circuit for the refrigerant supply means including a switch in the circuit, an electric circuit for the defrosting means including a switch in the circuit, actuating means for said switches respectively, a condition responsive device responsive to conditions of the cooling unit, means including a member operatively connecting the device with the actuating means for the supply means switch whereby the same is controlled in response to conditions of the cooling unit, a manually operable cam engageable with said member for varying the operative relationship between the device and said actuating means, whereby to determine the conditions in response to which said device through the member will effect operation of the supply means switch, a movable member, means carried by said cam for moving said movable member in a certain direction, and said actuating means for the supply means switch including a part engageable by said movable member when moved in said direction by the cam to hold the actuating means in an inoperative position whereby the supply means switch is maintained open.

IRA E. McCABE.

REFERENCES CITED

The following references are of record in the file of this patent:

UNITED STATES PATENTS

| Number | Name | Date |
| --- | --- | --- |
| 2,115,677 | Bast | Apr. 26, 1938 |
| 2,126,285 | Schaff | Aug. 9, 1938 |
| 2,244,892 | Newton | June 10, 1941 |
| 2,313,390 | Newton | Mar. 9, 1943 |